United States Patent [19]

Hirschmann

[11] Patent Number: 4,862,041
[45] Date of Patent: Aug. 29, 1989

[54] DIMMABLE ELECTRONIC TRANSFORMER CIRCUIT

[75] Inventor: Walter Hirschmann, Munich, Fed. Rep. of Germany

[73] Assignee: Patent-Treuhand-Gesellschaft fur elektrische Gluhlampen m.b.H., Munich, Fed. Rep. of Germany

[21] Appl. No.: 107,934

[22] Filed: Oct. 13, 1987

[30] Foreign Application Priority Data

Oct. 15, 1986 [DE] Fed. Rep. of Germany ....... 3635109

[51] Int. Cl.⁴ .............................................. H05B 41/24
[52] U.S. Cl. .................................... 315/246; 315/194; 315/DIG. 4; 315/DIG. 5
[58] Field of Search .................. 315/DIG. 4, DIG. 5, 315/194, 246; 313/579

[56] References Cited

U.S. PATENT DOCUMENTS 3,243,653   3/1966   Locklin ................................ 315/194
4,687,963   8/1987   Gagnon et al. ...................... 313/579

OTHER PUBLICATIONS

J. Wutstehube: "Schaltnetzeteile", p. 34 et seq. (Switch Mode Power Supply) 2nd Edition 1982.
W. Hirschmann: "Elektronikschaltungen", p. 147 et seq. (Electronic Circuits) ©1982.
Siemens: SIPMOS Transistors Application Notes 1983, p. 34 et seq.

Primary Examiner—Robert L. Griffin
Assistant Examiner—T. Salindong
Attorney, Agent, or Firm—Frishauf, Holtz, Goodman & Woodward

[57] ABSTRACT

To permit dimming of a halogen incandescant lamp, or set of lamps connected to an electronic transformer circuit which receives operating voltage from a power network, rectifies the current supply and chops the rectified power to provide high-frequency alternating voltage for transformation to low voltage of the incandesent lamp, a non-current compensated choke having an inductance of at least 50 mH is connected in series between the rectifier output terminals and the rectifier system terminals, an oscillation start acceleration circuit including a CR circuit is connected in parallel with the starting circuit for the alternately operating transistors and a pair of symmetry resistors (R6,R7) are connected in parallel to symmetry defining capacitors (C6,C7), connected across the rectifier output terminals and a mid-point (M) of the oscillation transistors. The arrangement permits soft starting of the transistors, even if a serially connected phase controlled dimmer circuit suddenly connects line voltage at peak value across the rectifier, while providing for continuous energy release, even if the dimmer control is turned beyond the 90° phase angle position and, for example, to 135° phase angle.

9 Claims, 1 Drawing Sheet

DIMMABLE ELECTRONIC TRANSFORMER CIRCUIT

Reference to related publications:

J. Wüstehube: "Schaltnetzteile", pp. 34 et seq. (Switch Mode Power Supply);

W. Hirschmann: "Elektronikschaltungen", pp. 147 et seq. (Electronic Circuits);

Siemens: SIPMOS Transistors Application Notes 1983, pp. 34 et seq.;

Reference to related patent disclosure which is hereby incorporated by reference: U.S. Pat. No. 4,438,372, Zuchtriegel.

The present invention relates to a dimmable electronic transformer circuit and more particularly to a circuit arrangement to operate low-voltage halogen incandescent lamps having power ratings of 10 W or more, for example ratings of 12 V, with 50, 70 or 100 W from a power network.

BACKGROUND

Various circuit arrangements have been proposed to operate 6, 12 or 24 V halogen incandescent lamps from power networks, supplying, for example, alternating power at 220 V, 50 Hz, or 110 V, 60 Hz. The cited literature reference describes various circuits of this type. Such electronic circuits, which frequently are referred to as "electronic transformers", permit the operation of low-voltage lamps, for example halogen incandescent lamps, by a brightness control element, which is customarily referred to as a dimmer. Dimmers, as usually used, operate by phase controlling the supply power. Use of conventional, commercial dimmers, with phase control, leads in many circuits to abrupt hard switching from OFF to ON condition, which places great stresses on the electronic lamp circuit and, under some conditions, leads to an intermittent or flickering lamp operation.

Typical electronic transformer circuits utilize a transistor switching arrangement, providing high-frequency output by alternately switching two transistors, connected in a self-starting half-bridge oscillator circuit. The transistors are connected to a starting circuit including a starting resistor, starting capacitor, starting diac and starting diode. The transistors have their main current paths serially connected across an input capacitor to the circuit, coupled to the output of a rectifier system; the series connected transistors define a common middle junction to which a symmetry maintaining circuit, for example including two capacitors, is connected. The lamp itself is connected to the secondary of the lamp transformer which has its primary winding connected between the common middle junction between the transistors and the symmetry defining capacitors.

THE INVENTION

It is an object to provide a circuit arrangement which permits use of a circuit of the type described with phase control dimmers and, particularly under low brightness conditions, causes soft gradual switching ON of the circuit by the dimmer. The circuit, additionally, should effectively be independent of the power requirements of the load, that is, of the lamp placed thereon, namely whether a 10 W or 100 W lamp is provided, or a 100 W load is represented by a plurality of lesser power lamps, connected in parallel.

Briefly, a non-current compensated choke which has an inductance of at least 50 mH is connected in series between the rectifier output terminals and the input to the lamp circuit, which is also formed by the rectifier output capacitor. An oscillating start acceleration circuit is provided, formed of a series circuit including an oscillation capacitor and an oscillation resistor, connected in parallel to the normally provided starting resistor of the starting circuit for the transistors. Additionally, the symmetry-defining capacitors are bridged by respective identical resistors.

The circuit has the advantage that the operating voltage rise for the transistors is more gradual than without the presence of the non-current compensated choke structure. The oscillation acceleration circuit formed by the capacitor and resistor permits starting of oscillation of the oscillatory circuit also if only low voltages are present. Thus, a dimmer to which the circuit is connected permits control of the light output of the lamps without any abrupt changes in brightness, or jumps in brightness, or without flicker. The symmetry defining circuit, normally formed by capacitors, with parallel connected resistors ensures that upon initial, as well as periodic starting, the transistor supply voltage becomes half and thus the turn-ON currents of the transistors are reduced.

The transformer for the lamp, preferably, is a transformer which does not have an air gap. This causes oscillation to discontinue if the load is removed. Thus, if the load is formed by a single low-voltage lamp, and the lamp burns out, or is removed, damage to the circuit components and particularly to the transistors is thereby effectively avoided. Placing a capacitor into the secondary of a transformer, which connects the secondary to either the positive or negative output terminals of the rectifier system provides for high-frequency short-circuit and thus effective elimination of radio interference voltages or noise, so that the transformer itself will not act as a radiator.

The transistors are preferably located on a cooling plate or heat sink. In accordance with a feature of the invention, the heat sink is connected to the positive terminal of the circuit. This further reduces radio noise interference. Two high-frequency chokes are preferably also connected in the circuit. Alternatively, current compensated chokes can be used in the supply circuit to the transistors. If the capacitors used have low capacity, the addition of high-frequency filter chokes, or current compensated chokes in the supply lines are particularly desirable. Use of low capacitors results in effectively sinusoidal current acceptance by the circuit if no dimmer is included, or if the dimmer is set on "high" so that, in effect, the rectifier is supplied with essentially pure sinusoidal power.

DRAWINGS

The single FIGURE illustrates the circuit in accordance with the present invention.

DETAILED DESCRIPTION

Figure 1:
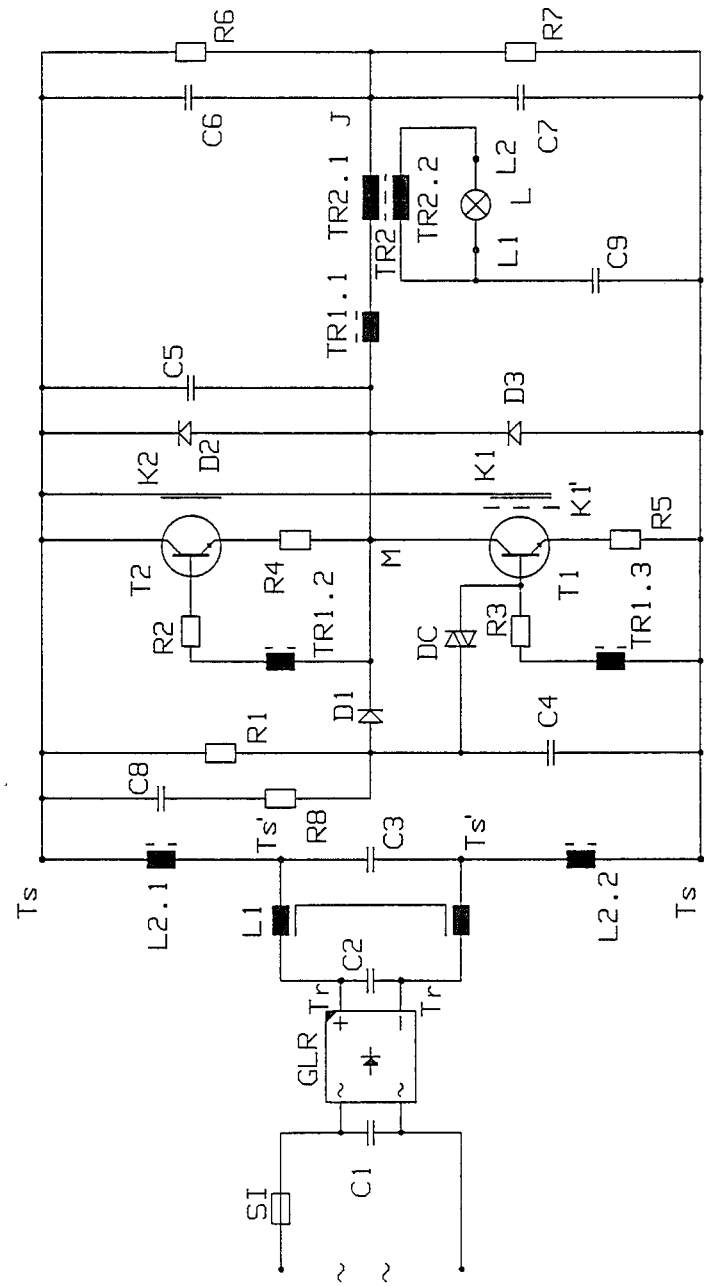

The FIGURE shows the circuit connected to a single halogen incandescent lamp L; rather than using one halogen incandescent lamp, a plurality of such lamps can be connected in parallel. The voltage ratings of currently standard halogen incandescent lamps are between 6 V and 24 V; the circuit, of course, operates also with lamps of different voltages, and with different loads.

As seen in FIG. 1, the input terminals are connected through a fuse SI to a rectifier GLR. An input capacitor C1 is a first or input filter capacitor. The output of the rectifier GLR, which may be of any standard or suitable construction, is bridged by a second filter capacitor C2. The output terminals of the rectifier GLR are shown at Tr.

In accordance with a feature of the invention, the output terminals Tr of the rectifier GLR are connected through individual windings of a non-current compensated choke L1 to terminals Ts'. A rectifier output capacitor C3 is connected across terminals Ts'. Each terminal Ts' is connected through a respective winding L2.1 and L2.2 of a respective choke to the output terminals Ts of the rectifier system. The windings L2.1 and L2.2 may be mere high-frequency choke windings wound, for example, on a rod ferrite core; or may be respective windings of a current compensated choke. In either event, the circuit diagram will be the same.

A half-bridge circuit formed by transistors T1, T2 is provided. The main current paths, that is, connected to emitter, are connected through respective emitter resistors R4,R5 in series. A mid or center junction M is defined between the serially connected transistors T1,T2. The transistors have parallel connected freewheeling diodes D2,D3 connected between the respective terminals Ts and M, respectively. The transistors are connected into an oscillating system including resistor R1 and capacitor C4, the junction of which is connected through a diac DC to the base of transistor T1. The bases of the transistors have respective resistors R2,R3 connected thereto, which, in turn, are serially connected to feedback coils TR1.2 and TR1.3 of a feedback transformer, having its primary coil TR1.1 connected to the junction M, as will appear below. A capacitor C5 is connected between the junction M and the positive terminal of the output terminal Ts.

The system oscillates in accordance with a well-known feedback principle and is formed, essentially, by the secondary windings TR1.2 and TR1.3. Both transistors are seated on a heat sink shown schematically at K1 and K2. The heat sink is connected to the positive terminal Ts of the rectifier system. The heat sink K1 on which the transistor T1 is located is insulated with respect to the housing of the transistor T1, as schematically shown by the broken line K1'.

In accordance with a feature of the invention, the resistor R1 of the starting circuit has a start acceleration circuit connected in parallel thereto, formed by the series connection of a capacitor C8 and a resistor R8.

A symmetry circuit formed by two serially connected capacitors C6,C7 is connected in parallel to the main switching paths of the trasistors T2,T1. In accordance with a feature of the invention, a pair of resistors R6,R7 are connected in parallel to the capacitors C6,C7. The capacitors C6,C7, together with the parallel connected resistors R6,R7 define a common or center junction J. The primary winding TR1.1 of the feedback transformer is connected in series between the mid junction M between the transistors T1,T2 and the common junction J of the symmetry circuit C6,R6,C7,R7. Additionally, the primary winding TR2.1 of the lamp transformer is serially connected between the junctions M and J. The secondary winding TR2.2 of the lamp transformer is directly connected to the lamp terminals L1,L2 to supply the low voltage halogen incandescent lamp, or lamps L. Additionally, a capacitor C9 is connected from one of the terminals of the secondary of the transformer winding TR2.2 to the negative terminal Ts of the rectifier system.

The circuit is particularly suitable to operate low-voltage halogen incandescent lamps, or similar loads, with an external dimmer, in which, when used with a dimmer operating on phase control, no separate dimmer accessory, ballast, or pre-loading circuit is necessary. The circuit input terminals, ahead of the fuse SI, can merely connect to the output terminals of the dimmer. The circuit is of course also suitable for direct operation without a dimmer, by direct connection to an a.c. power network. The circuit ensures that current taken from the power network will be sinusoidal.

OPERATION

The basic operation of a half-bridge circuit is well known, see the referenced literature, for example the book by Wüstehube, "Schaltnetzteile", pages 34, et seq. The book by Hirschmann, "Elektronikschaltungen", pages 147 et seq., describes the application of half-bridge circuits to operate lamps. Reference may also be had to U.S. Pat. No. 4,438,372, Zuchtriegel, assigned to the assignee of the present application, and the disclosure of which is hereby incorporated by reference.

The high inductance of the non-current compensated choke L1 prevents hard, abrupt turning ON of the circuit when the dimmer is operated, that is, when the phase control prevents supply in accordance with the sine wave. The choke L1 is preferably constructed as a two-chamber, or dual core choke, as schematically shown in FIG. 1 by the core line between the two windings. If so constructed, the choke can also contribute and be used for radio noise or spark interference suppression, that is, both for suppression of X-interferences as well as for Y-interferences. If the inductance of the choke L1 is sufficiently high, the choke together with the capacitors C2, C3,C6,C7 will store sufficient energy so that the oscillation will continue in the range of the supply wave between 0° and 135°, that is, will not terminate during the time when no network voltage is supplied, so that, at the next supply fragmentary wave—as controlled by the dimmer—it will continue the oscillation wave, and thus increase gradually and cause, at the next voltage wave—as controlled by the dimmer—a gradual rise.

The oscillation start acceleration circuit formed by the capacitor C8 and the resistor R8 transfers the periodic turn-ON pulse from the dimmer, occurring periodically, immediately via the capacitor C4 and the diac DC to the base of the transistor T1, which will turn ON without time delay. Without this oscillation start acceleration circuit, the transistor T1 would fire or become conductive with some delay time. The delay time would become excessive if the dimmer is set to a value substantially dimming the lamps, resulting in flicker of the lamp L, and non-uniform light emission therefrom. The normal operation of the lamp would be disturbed. Additionally, the circuit would, however, at each ON-pulse be at full operating voltage. This would result in excessive turn-ON peak currents for the transistors T1 and T2, which would result in excessive oscillation and over-voltage oscillatory conditions of the supply d.c. voltage.

The symmetry circuit which is modified by the presence of the resistors R6,R7, in parallel to the capacitors C6,C7 is of particular importance when the phase control voltage is high. If the dimmer is set to turn ON the supply voltage at 90° of the voltage wave, that is, at maximum value, the transistors T1,T2 are turned ON at maximum voltage. This results in hard, or abrupt switching of the transistors T1,T2. This operation is difficult for the transistors to handle, and, further, provides undesirable loading to the windings of the transformer TR2, that is, windings TR2.1 and TR2.2. To prevent the windings from going into saturation, the voltage divider divides the half-wave supply voltage by two for the transformer.

Utilizing a transformer without air gap results in a circuit which has high inductance and thus a long discharge time constant if the load is removed. The oscillation, thus, will be stopped due to the large discharge time constant. The remaining very low quiescent current or low load current is insufficient in order to maintain the circuit in oscillation over the highly reduced current feedback through the transformer TR1—that is coupling of the coils TR1.2 and TR1.3 with the winding TR1.1. Oscillation will be triggered only upon firing of the diac DC which will occur with a substantially lower repetition frequency, that is, less than 500 Hz. The repetition frequency is determined by the values of the R-C circuit formed by resistor R1 and capacitor C4, together forming a timing circuit.

A circuit to operate a 100 W low voltage halogen incandescent lamp with rated operating voltage of 12 V from the power network of 220 V, 50 Hz was constructed using the components of table 1, attached hereto and forming part of the specification.

Various changes and modifications may be made within the scope of the inventive concept.

TABLE 1

| SI, Fuse | 0.5 A |
|---|---|
| C1, C2 | 0.1 μF |
| GLR | A0540 |
| L1 | Non-Current Compensated Choke 60 mH |
| C3, C6, C7 | 0.22 μF |
| L2.1, L2.2 | Ferrite Rod Choke 47 μH |
| C8 | 10 nF |
| R8 | 3.3 kΩ |
| R1, R6, R7 | 220 kΩ |
| D1 | 1N4004 |
| C4 | 22 nF |
| DC | N413M |
| R2, R3 | 2.2 Ω |
| R4, R5 | 0.27 Ω |
| T1, T2 | MJE 13007 |
| TR1.1, TR1.2, TR1.3 | Type EF16, 5/15 + 15 Turns |
| D2, D3 | 1N4937 |
| C5 | 560 pF |
| TR2.1, TR2.2 | Type E30/12, 76/9 Turns |
| C9 | 3.3 nF |

We claim:

1. Electronic transformer circuit for operation of a low-voltage load (L), and especially an incandescent lamp, having terminals (L1, L2), from an a.c. power network having a substantially higher supply voltage, said circuit being capable of connection to said power network through a dimmer circuit utilizing phase control, said circuit having
a rectifier system adapted for connection to the power network, said rectifier system including system output terminals (Ts), a rectifier (GLR) having rectifier output terminals (Tr) and a rectifier output capacitor (C3) of low capacity value connected across the system output terminals;

a self-starting half-bridge oscillator circuit connected in parallel across the rectifier system output terminals (Ts) including two alternately conducting transistors (T1, T2) having their main current paths serially connected across the rectifier system output terminals and defining, between said transistors, a common middle junction (M), a feedback circuit (TR1.1, TR1.2; TR1.3) coupled to said transistors to operate the transistors as a freely oscillating half bridge oscillator; and a starting circuit for the transistors, including a starting resistor (R1), a starting capacitor (C4), a starting diac (DC) and a starting diode (D1) connected to provide for triggering one of the transistors to operate the transistors as the freely oscillating half-bridge oscillator;

a symmetry circuit including two symmetry capacitors (C6, C7) of equal capacity value, each having one terminal connected across the main current paths of the respective transistors and each having a second terminal connected together and defining a junction (J), said junction being coupled to said common middle junction (M); and a lamp supply transformer (TR2) having a primary winding (TR2.1) connected between the common middle junction (M) of the transistors and the junction (J) of the second terminals of the symmetry capacitors (C6, C7), said transformer (TR2) forming the coupling to the common middle juntion (M) and having a secondary winding (TR2.2) to which the terminals (L1, L2) of the load (L) are connected, and comprising, in accordance with the invention, a non-current-compensated choke (L1) having an inductance of at least 50 mH connected in series between the rectifier output terminals (Tr) and the system output terminals (Ts) for storing energy from said rectifier and providing for substantially sinusoidal power to said rectifier;

an oscillation start-accelerating circuit (C8, R8) comprising a series circuit including an accelerating capacitor (C8) and an accelerating resistor (R8) connected in parallel to the starting resistor (R1) of the starting circuit; and a pair of symmetry resistors (R6, R7) of equal resistance value, each symmetry resistor of the pair being connected in parallel to a respective symmetry capacitor (C6, C7) and hence to said junction (J), thereby providing for gradual transistor voltage adjustment and substantially flicker-free brightness of the lamp upon operation of the circuit at less than full wave from said a.c. power network upon phase control by said dimmer.

2. The circuit of claim 1, wherein the lamp supply transformer (, TR2; TR2.1, TR2.2) has a core without air gap.

3. The circuit of claim 1, further including a capacitor (C9) connected to one (L1) of the load terminals (L1,L2) and further coupled to one of the system output terminals (Ts).

4. The circuit of claim 1, further including a heat sink or cooling element (K1,K2) to which said transistors (T1,T2) are secured, said cooling element being connected to the system output terminal (Ts) which is the positive rectifier output terminal.

5. The circuit of claim 1, wherein the rectifier output capacitor (C3) is directly connected to terminals (Ts') of the non-current compensated choke (L1) remote from the connection of the choke to the rectifier output terminals (Tr);

and wherein a further choke (L2.1, L2.2) is provided, serially connected between said terminals (Ts') of the rectifier output capacitor and the rectifier system output terminals (Ts).

6. The circuit of claim 5, wherein said further choke comprises high-frequency filter choke elements (L2.1,L2.2).

7. The circuit of claim 5, wherein said further choke comprises a current compensated choke.

8. The circuit of claim 1, wherein said load (L) comprises a halogen incandescent lamp.

9. The circuit of claim 8, wherein the nominal voltage of said halogen incandescent lamp is 6, 12 or 24 V, and the power network voltage is 110 or 220 V.

* * * * *